No. 680,807. Patented Aug. 20, 1901.
J. B. PENDLETON.
APPARATUS FOR AUTOMATICALLY APPLYING GERMICIDES.
(Application filed Mar. 16, 1901.)
(No Model.)
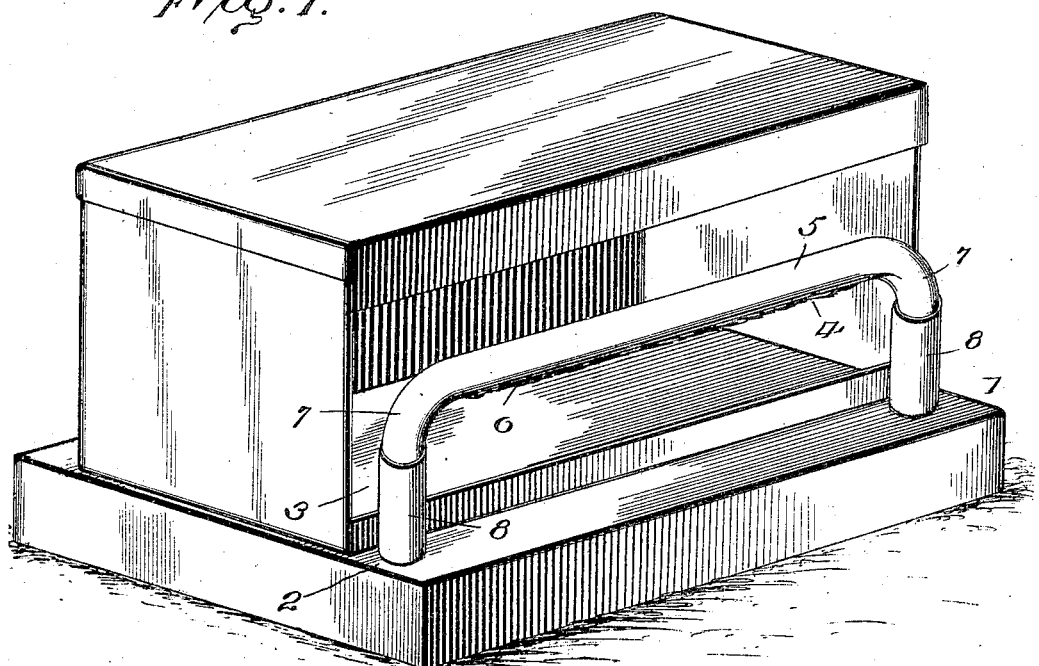
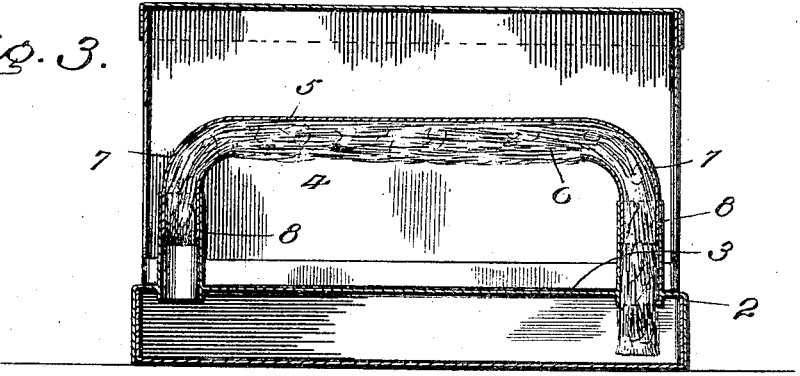
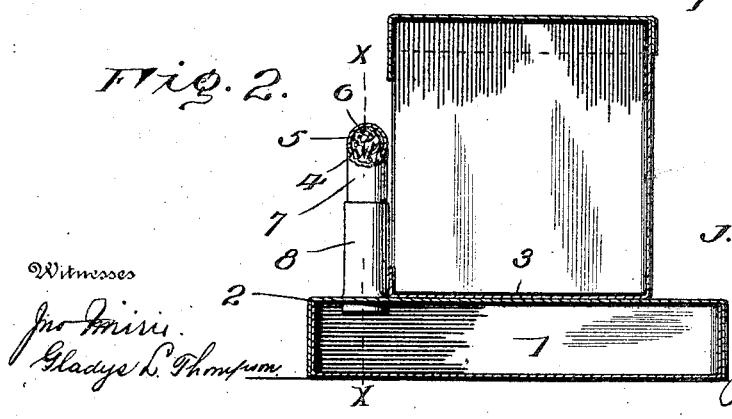
Witnesses
Inventor
J. B. Pendleton.
by
R. S. & A. B. Lacey.
Attorneys

UNITED STATES PATENT OFFICE.

JOHN B. PENDLETON, OF STRAWN, TEXAS, ASSIGNOR OF TWO-THIRDS TO T. R. HALL AND E. H. RHODES, OF SAME PLACE.

APPARATUS FOR AUTOMATICALLY APPLYING GERMICIDES.

SPECIFICATION forming part of Letters Patent No. 680,807, dated August 20, 1901.

Application filed March 16, 1901. Serial No. 51,522. (No model.)

*To all whom it may concern:*

Be it known that I, JOHN B. PENDLETON, a citizen of the United States, residing at Strawn, in the county of Palo Pinto and State of Texas, have invented certain new and useful Improvements in Apparatus for Automatically Applying Germicides; and I do hereby declare the following to be a full, clear, and exact description of the invention, such as will enable others skilled in the art to which it appertains to make and use the same.

It is well known that poultry and stock are troubled generally with fleas and parasitic insects which annoy, harass, and otherwise materially detract from their thriving.

This invention provides a means for automatically applying an insecticide or germicide which will either kill or drive off the parasite, vermin, and other troublesome germ.

The invention consists of a trough for either food or drink inclosed so access can be had thereto from a given side, across which is placed a distributer charged with the germicide and against which the fowl or stock, as the case may be, must brush when eating or drinking, whereby a portion of the insecticide will be applied thereto.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1 is a perspective view of an apparatus specially designed for attaining the objects of this invention. Fig. 2 is a transverse section. Fig. 3 is a vertical section about on the line X X of Fig. 2 looking to the left, as indicated by the arrows.

Corresponding and like parts are referred to in the following description and indicated in all the views of the drawings by the same reference characters.

The apparatus comprises a pan or tank 1 of a size to hold a sufficient quantity of a germicide, insecticide, or kindred medicine for killing or driving off parasites and vermin of every character. This pan or tank 1 is preferably shallow and constructed of metal and is closed at its top by a cap or cover 2, surmounted by the trough and distributer. The cap or cover is formed with a pendent rim or flange to embrace the sides of the pan or tank, so as to prevent lateral displacement and a too rapid evaporation of the medicine.

The trough 3 is constructed so as to receive either food or drink and is placed upon the cap or cover 2 and is preferably attached thereto in such a manner as to prevent any possible displacement. This trough is closed at its ends, back, and top and is accessible from one side only. By having the trough accessible from one side only the construction is simplified, and it is not necessary to provide more than one distributer for the germicide or medicine. If more than one side is left open, it is obvious that a distributer must be provided for each approach or opening in order to effectually attain the ends of the invention.

The distributer consists of a horizontal pipe 4, having a slot 5 in its lower portion through which protrudes a wick or absorbent material 6, charged with the germicide or medicine to be applied to the fowl or stock to be treated. Elbows 7 are applied to the ends of the horizontal plate 4 and connect by a slip-joint with tubular extensions 8, projecting vertically from the cap or cover 2 at each end of the open side leading to the trough. The wick or absorbent material 6 fills the pipe 4 and elbows 7, and an end portion is extended and dips into the medicine contained in the pan or tank 1, the opposite end of the wick or absorbent material terminating a distance above the level of the medicine, so as not to extend therein. The elbows 7 and tubular extension 8 form end portions of the distributer and are located at the ends of the openings leading to the trough. The horizontal portion 4 of the distributer extends over the open side of the trough and is disposed with reference thereto to insure the fowl or stock brushing against the exposed portion of the wick or absorbent material 6, so as to take up a portion of the medicine or insecticide.

The size and construction of the apparatus will depend upon the particular use and for fowl will be comparatively small, whereas for stock—such as sheep, swine, and the like—the apparatus will be of such dimensions as may be found necessary to insure a distribution of the insecticide when the animal approaches the trough either to feed or drink.

It is important that one end only of the wick or absorbent material 6 be dipped into the medicine in order to prevent wasting thereof. The end of the wick dipping into the medicine takes up the same by capillary attraction, and such medicine permeates the wick throughout its extent, and the surplus amount drips back into the pan or tank 1 from the elevated end of the wick. The exposed portion of the wick or absorbent material appearing at the slot 5 is charged at all times with the medicine, which latter is supplied to the fowl or stock in the manner stated. The slip connection of the pipe 4 with the extensions 8 enables the wick or absorbent material 6 to be placed in position or to be removed when required for any purpose.

Having thus described the invention, what is claimed as new is—

1. In apparatus for dispensing an insecticide or kindred medicine, a tank, a trough, a distributer located at a side of the trough to be brushed against by the fowl or stock when feeding and comprising a wick or absorbent material having pendent end portions one end dipping into the medicine to take up the same and the opposite end elevated therefrom to return an excess of medicine, substantially as set forth.

2. In apparatus for dispensing an insecticide or kindred medicine, a trough, a tank for holding a supply of the medicine, and a distributer located at a side of the trough so as to be brushed against by the fowl or animal when feeding, said distributer comprising a tube having bent end portions and having a side opening and wick or absorbent material located in the tube and the bent ends thereof and having a portion protruding through the side opening, one end of the absorbent material dipping into the tank and the other end being elevated therefrom, substantially as set forth.

3. In apparatus for dispensing a germicide or kindred medicine, a trough, a tank for holding the medicine, and a distributer at a side of the trough to be brushed against by the fowl or stock when feeding, said distributer comprising a horizontal pipe having a side opening, end pieces composed of telescopic parts, and a wick or absorbent material fitting the horizontal pipe and end extensions and having an end portion dipping into the medicine and an intermediate portion protruding through the opening of the pipe, substantially as set forth.

4. The herein-described apparatus for dispensing an insecticide or kindred medicine, the same consisting of a pan or tank, a cover therefor, a trough mounted upon the cover, tubular extensions projected from the said cover, a horizontal pipe having a side opening and end extensions to make connection with the aforementioned tubular extensions by a slip-joint, and a wick or absorbent material fitted into the horizontal pipe and the end extensions thereof and having one end dipping into the medicine contained in the tank, substantially as set forth.

In testimony whereof I affix my signature in presence of two witnesses.

JOHN B. PENDLETON. [L. S.]

Witnesses:
M. G. VERNON,
A. L. HARMON.